United States Patent
Wang (10) Patent No.: US 9,347,811 B2
(45) Date of Patent: May 24, 2016

(54) DROPPER ASSEMBLY

(71) Applicant: WELL MAX BEAUTY LAB CO., LTD., Tainan (TW)

(72) Inventor: Teng-Huei Wang, Tainan (TW)

(73) Assignee: Well Max Beauty Lab Co., Ltd., Tainan (TW)

( * ) Notice: Subject to any disclaimer, the term of this patent is extended or adjusted under 35 U.S.C. 154(b) by 295 days.

(21) Appl. No.: 14/033,193

(22) Filed: Sep. 20, 2013

(65) Prior Publication Data

US 2014/0209206 A1    Jul. 31, 2014

(30) Foreign Application Priority Data

Jan. 28, 2013   (TW) .............................. 102201826 U (51) Int. Cl.
*B01L 3/02* (2006.01)
*G01F 11/08* (2006.01)

(52) U.S. Cl.
CPC ................................. *G01F 11/084* (2013.01)

(58) Field of Classification Search
CPC ........ A45D 40/26; B05B 11/309; B65B 1/04; B65D 47/00; B65D 5/66; B65D 83/0022
USPC .............. 141/22, 23, 24, 90; 222/145.5, 320, 222/321.1, 336, 342, 372, 630, 631
See application file for complete search history.

(56) References Cited

U.S. PATENT DOCUMENTS

| | | | | |
|---|---|---|---|---|
| 2,781,063 A * | 2/1957 | Williams | .............. | B01L 3/0282 141/24 |
| 3,101,751 A * | 8/1963 | Ballin | ................... | B01L 3/0282 141/24 |
| 3,820,576 A * | 6/1974 | Torrent | ................. | B01L 3/0282 141/24 |
| 4,278,360 A * | 7/1981 | Lorscheid | .............. | A56D 34/04 141/18 |
| 4,376,591 A * | 3/1983 | Proffer | ................... | A45D 34/04 141/24 |
| 4,454,964 A * | 6/1984 | Sacher | .................... | G01F 11/06 222/309 |
| 4,579,153 A * | 4/1986 | Goncalves | ............ | B01L 3/0282 141/23 |
| 5,018,394 A * | 5/1991 | Gilson | .................. | B01L 3/0224 422/925 |
| 5,226,572 A * | 7/1993 | Gargione | .............. | B01L 3/0272 141/24 |
| 5,746,349 A * | 5/1998 | Putteman | .............. | A61J 1/2096 141/22 |

(Continued)

*Primary Examiner* — Jason K Niesz
*Assistant Examiner* — Andrew Schmid
(74) *Attorney, Agent, or Firm* — Lewis Rocca Rothgerber Christie LLP (57) ABSTRACT

A dropper assembly includes a dropper mechanism that includes a locking connector, an adjusting cap, and a press button. The locking connector has at least one dosage guide unit with a plurality of dosage guide grooves having different depths. The press button has at least one alignment rib portion insertable into one of the dosage guide grooves. The press button is driven by the adjusting cap to rotate between a locked position, where the alignment rib portion abuts against a top end of the locking connector and is thereby limited from being pressed downward, and a pressable position, where the alignment rib portion is aligned with one of the dosage guide grooves to enable pressing movement of the press button.

8 Claims, 7 Drawing Sheets

(56) References Cited

U.S. PATENT DOCUMENTS

| | | | | |
|---|---|---|---|---|
| 5,792,424 A * | 8/1998 | Homberg | B01L 3/0224 | 422/515 |
| 5,836,359 A * | 11/1998 | Seidler | B01L 3/0224 | 141/23 |
| 5,849,248 A * | 12/1998 | Homberg | B01L 3/0224 | 422/516 |
| 6,045,003 A * | 4/2000 | Seidler | B01L 3/0224 | 141/23 |
| 6,112,779 A * | 9/2000 | Camilla | A61J 1/2096 | 141/22 |
| 6,170,343 B1 * | 1/2001 | Conley | B01L 3/0224 | 73/864.18 |
| 2010/0083775 A1 * | 4/2010 | Wilmer | B01L 3/0224 | 73/864.18 |
| 2011/0284123 A1 * | 11/2011 | Bouix | A45D 34/04 | 141/23 |
| 2012/0261029 A1 * | 10/2012 | Kim | A45D 34/04 | 141/23 |
| 2013/0074983 A1 * | 3/2013 | Choi | A45D 34/04 | 141/23 |
| 2013/0112314 A1 * | 5/2013 | Lee | A45D 34/04 | 141/23 |
| 2013/0192713 A1 * | 8/2013 | Drugeon | A45D 34/04 | 141/26 |
| 2014/0209206 A1 * | 7/2014 | Wang | G01F 11/084 | 141/24 |
| 2014/0234007 A1 * | 8/2014 | Lee | A45D 34/00 | 401/121 |
| 2014/0361047 A1 * | 12/2014 | Lee | B65D 41/56 | 222/372 |

* cited by examiner

DROPPER ASSEMBLY

CROSS-REFERENCE TO RELATED APPLICATION

This application claims priority of Taiwanese Application No. 102201826, filed on Jan. 28, 2013.

BACKGROUND OF THE INVENTION

1. Field of the Invention

The invention relates to a dropper assembly, more particularly to a dropper assembly having a dropper mechanism for stably and quantitatively dispensing a liquid.

2. Description of the Related Art

Cosmetic lotions are essential for most females. Generally, the cosmetic lotion is received in containers with a pump head or a spray head. In use, the cosmetic lotion in the conventional container is dispensed through the pump head in liquid form or through the spray head in spray form. However, dispensing of the cosmetic lotion through the spray head of the conventional container may result in unnecessary waste, while dispensing of the cosmetic lotion through the pump head may leave some residual cosmetic lotion in the flow channel of the pump head. In view of the fact that the conventional container with the pump head or the spray head is not suitable for storing expensive cosmetic lotion, cosmetic manufacturers use a dropper assembly to dispense the expensive cosmetic lotion. The conventional dropper assembly includes a pipette and a plastic head that is mounted on a top of the pipette. The pipette is driven to draw the cosmetic lotion from a container and to expel the cosmetic lotion from the pipette by consecutive squeezing and releasing operations of the plastic head. However, the conventional dropper assembly cannot ensure that the cosmetic lotion is drawn in precise quantities or dosages for each use. Although an exterior surface of the pipette may be provided with graduations, it is inconvenient to draw the cosmetic lotion for each use accompanied by careful observation of the graduations. In view of this, there is still a need for further improvement of the conventional dropper assembly.

SUMMARY OF THE INVENTION

Therefore, an object of the present invention is to provide a dropper assembly that can alleviate the aforesaid drawbacks of the prior art.

According to the present invention, a dropper assembly includes a container body, and a dropper mechanism that is disposed on the container body in a capping manner. The dropper mechanism includes a locking connector, an adjusting cap, a press button, a hollow suction member, and a pipette.

The locking connector is threadedly mounted on the container body and has at least one dosage guide unit indented from a top end of the locking connector. The dosage guide unit has a plurality of dosage guide grooves that are indented to different depths from the top end in a top-bottom direction.

The adjusting cap rotatably covers and is mounted on the locking connector. The adjusting cap has a top wall and a through hole extending through the top wall in the top-bottom direction.

The press button is mounted in the adjusting cap and extends upwardly and outwardly through the through hole. The press button has at least one alignment rib portion that protrudes outwardly from an outer surface of the press button, and that is insertable into one of the dosage guide grooves. The press button is driven by the adjusting cap to rotate between a locked position, where the alignment rib portion abuts against the top end of the locking connector and is thereby limited from being pressed downward, and a pressable position, where the alignment rib portion is aligned with one of the dosage guide grooves to enable pressing movement of the press button.

The hollow suction member is resiliently deformable to be pressed by the press button and is mounted between the press button and the locking connector. The hollow suction member defines an interior suction space.

The pipette is inserted into the hollow suction member in a fluidly communicating manner and extends downwardly into the container body.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
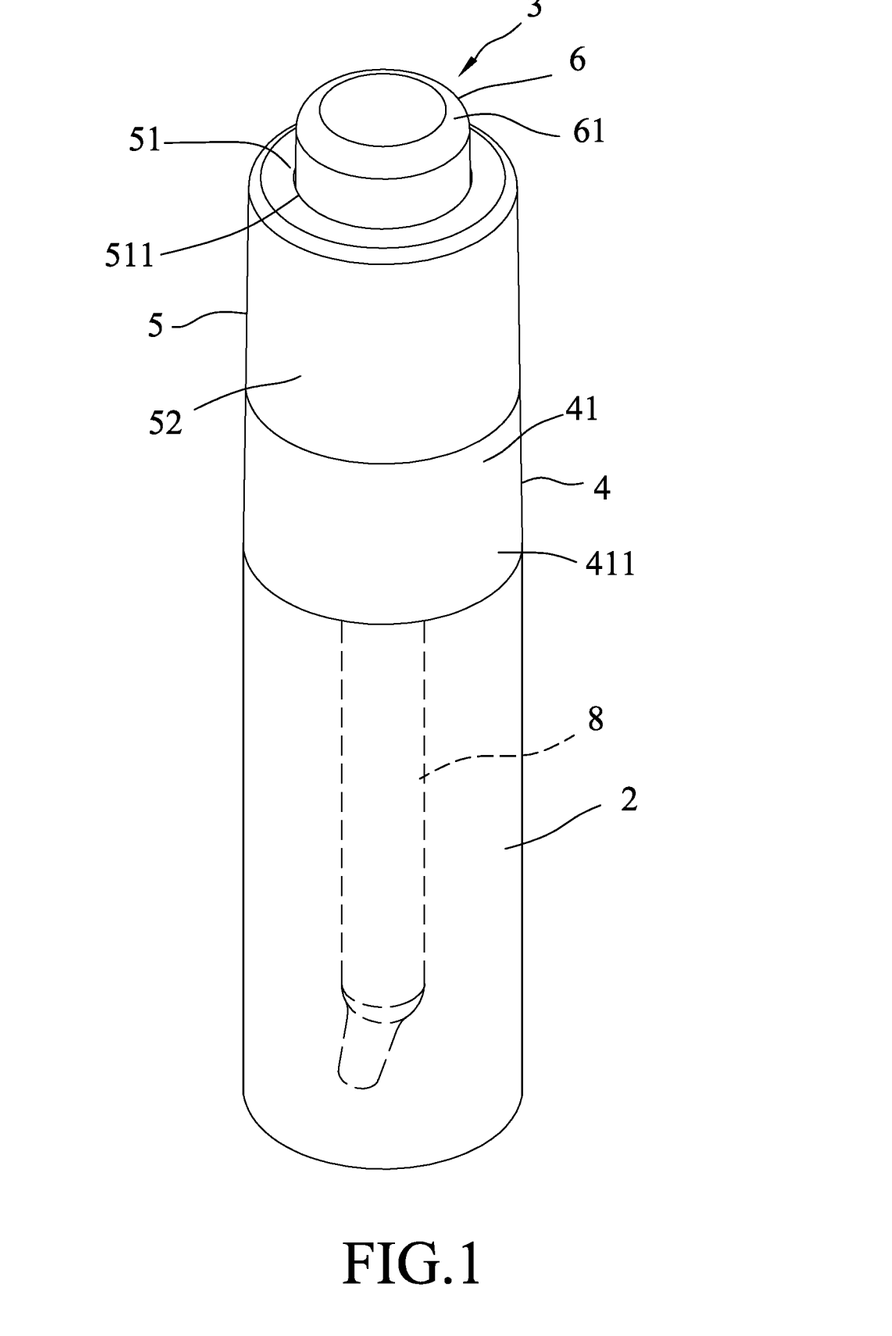
FIG. 1 is a perspective view of the preferred embodiment of a dropper assembly according to the present invention.
Figure 2:
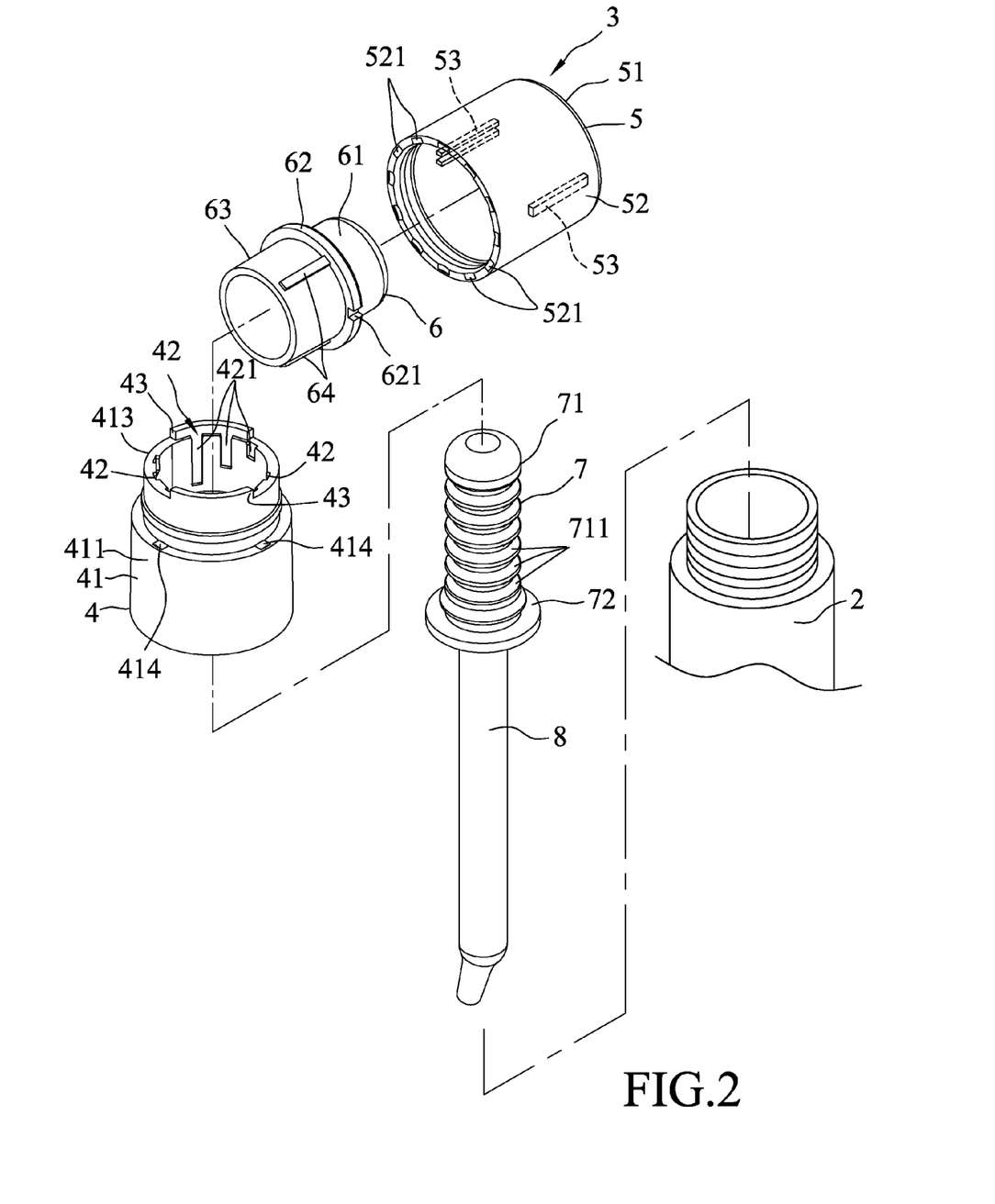
FIG. 2 is a fragmentary exploded perspective view of the preferred embodiment.
Figure 5:
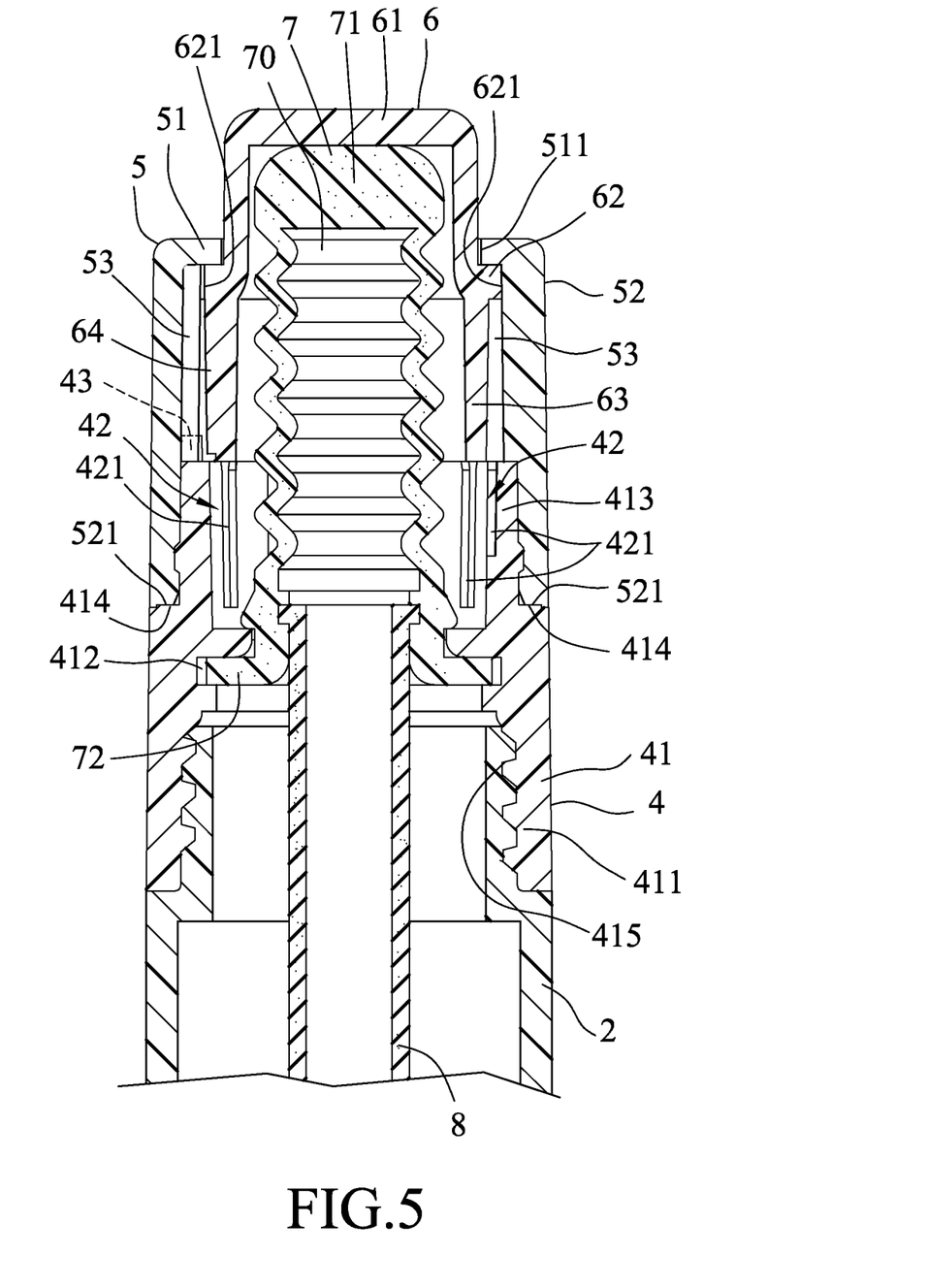
FIG. 5 is a sectional view of the preferred embodiment, illustrating the press button in a locked position.

Referring to FIGS. 1, 2 and 5, the preferred embodiment of a dropper assembly according to the present invention is illustrated. The dropper assembly is used to accommodate a liquid (not shown) and to dispense the liquid in a multi-staged manner. The liquid may be a cosmetic lotion or a liquid medicine. The dropper assembly includes a container body 2 and a dropper mechanism 3 disposed on the container body 2 in a capping manner. The dropper mechanism 3 is operable to draw and dispense the liquid accommodated in the container body 2.

In this embodiment, the dropper mechanism 3 includes a locking connector 4 that is threadedly mounted on the container body 2, an adjusting cap 5 that rotatably covers and is mounted on the locking connector 4, a press button 6 that is mounted in the adjusting cap 5, a hollow suction member 7 that is resiliently deformable to be pressed by the press button 6 and that is mounted between the press button 6 and the locking connector 4, and a pipette 8 that is inserted into the hollow suction member 7 in a fluidly communicating manner and that extends downwardly into the container body 2.

The locking connector 4 has at least one dosage guide unit 42 that is indented from a top end of the locking connector 4. The dosage guide unit 42 has a plurality of dosage guide grooves 421 that are indented to different depths from the top end of the locking connector 4 in a top-bottom direction.

Preferably, the locking connector 4 further has a locking ring 41 that is threadedly mounted on the container body 2, and at least one blocking flange 43 that protrudes from a top surface of the locking ring 41. The dosage guide unit 42 is disposed on the locking ring 41. The dosage guide grooves 421 extend downwardly from the top surface of the locking ring 41 inwardly of the blocking flange 43 and are indented from an inner surface of the locking ring 41. The locking ring 41 has an annular threaded portion 411 that has internal threads 415 formed on the inner surface of the locking ring 41 and that is threadedly mounted on the container body 2, an annular protruding portion 413 that projects upwardly from a top periphery of the annular threaded portion 411 and that has a diameter smaller than that of the annular threaded portion 411, and a positioning tab portion 414 that protrudes from the top surface of the locking ring 41. The blocking flange 43 protrudes from a top surface of the annular protruding portion 413. More preferably, the annular threaded portion 411 further has an engagement groove 412 that is indented radially from the inner surface of the locking ring 41 above the internal threads 415 of the annular threaded portion 411.

In this embodiment, the locking connector 4 has three of the dosage guide units 42 that are annularly and symmetrically spaced apart from each other on the locking ring 41 and two of the blocking flanges 43 that are angularly and symmetrically spaced apart from each other. The dosage guide grooves 421 of each of the dosage guide units 42 extend downwardly from the top surface of the annular protruding portion 413. An order of the different depths of the dosage guide grooves 421 of each of the dosage guide units 42 is the same as that of the dosage guide grooves 421 of the other one of the dosage guide units 42.

Figure 4:
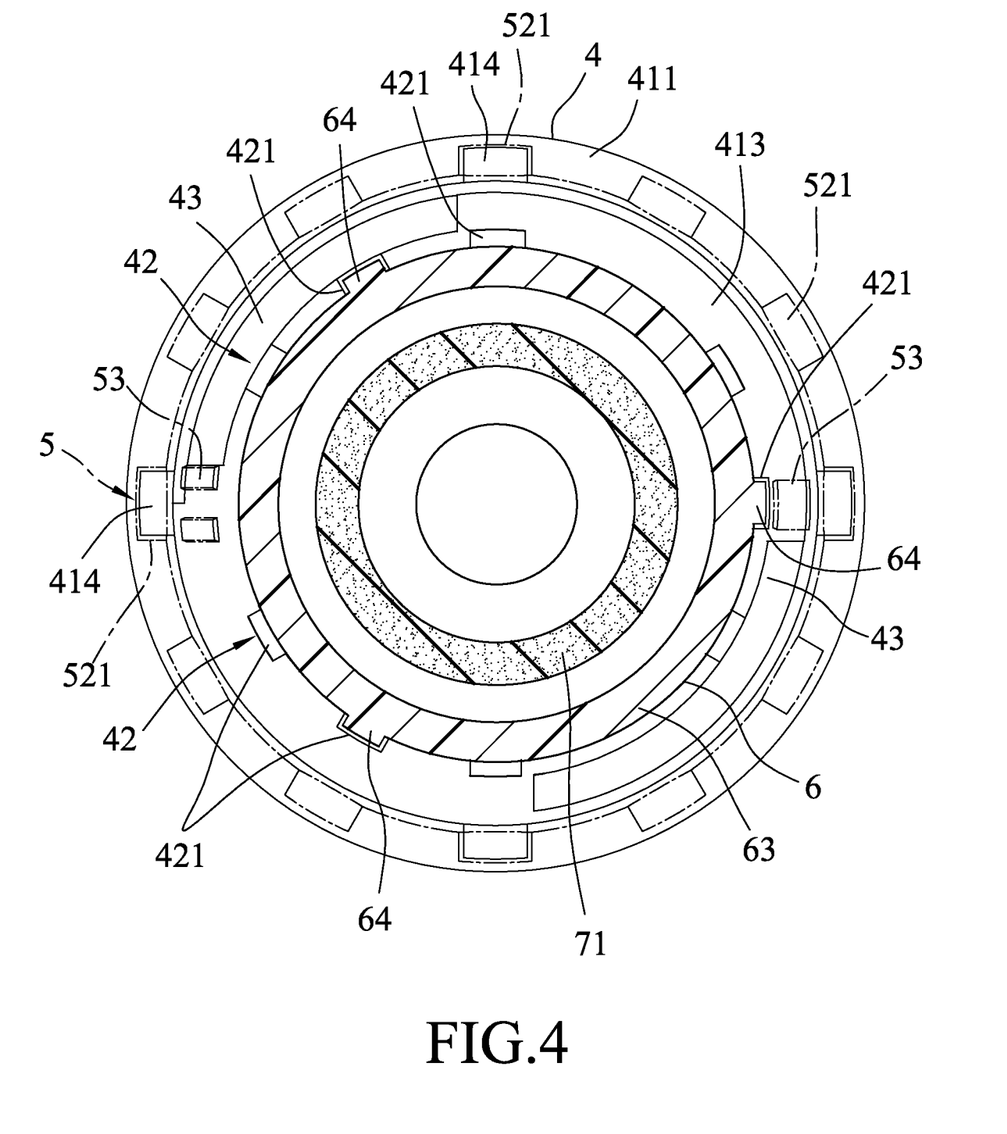
FIG. 4 is a partly sectional view of FIG. 1, illustrating relative positions among an adjusting cap, a locking connector and a press button, where the press button is in a pressable position.

Referring to FIGS. 2, 4, and 5, the adjusting cap 5 has a top wall 51, and a through hole 511 that extends through the top wall 51 in the top-bottom direction. Preferably, the adjusting cap 5 further has a surrounding wall 52 that extends downwardly from a periphery of the top wall 51 and that is rotatably sleeved on and positioned to the locking ring 41, and two driving rib units 53 each of which protrudes inwardly from an inner surface of the surrounding wall 52 and is rotatable together with the surrounding wall 52 to move on the top surface of the locking ring 41. In this embodiment, the surrounding wall 52 of the adjusting cap 5 is rotatably fitted around the annular protruding portion 413 of the locking ring 41 and is stacked on the positioning tab portion 414. The surrounding wall 52 has a plurality of positioning notches 521 that are annularly spaced apart from each other and that are indented from a bottom surface of the surrounding wall 52. The driving rib units 53 are disposed on the top surface of the annular protruding portion 413 and are angularly spaced apart from each other to be limited by the blocking flanges 43, respectively. When the surrounding wall 52 is rotated to drive the driving rib units 53 moving on the top surface of the annular protruding portion 413, the blocking flanges 43 are able to abut against and limit the driving rib units 53 to a limited amount of movement, respectively. Preferably, the locking ring 41 has a plurality of the positioning tab portions 414 each of which is releasably engaged with a respective one of the positioning notches 521, such that the adjusting cap 5 is stepwise rotatable relative to the locking connector 4.

Figure 3:
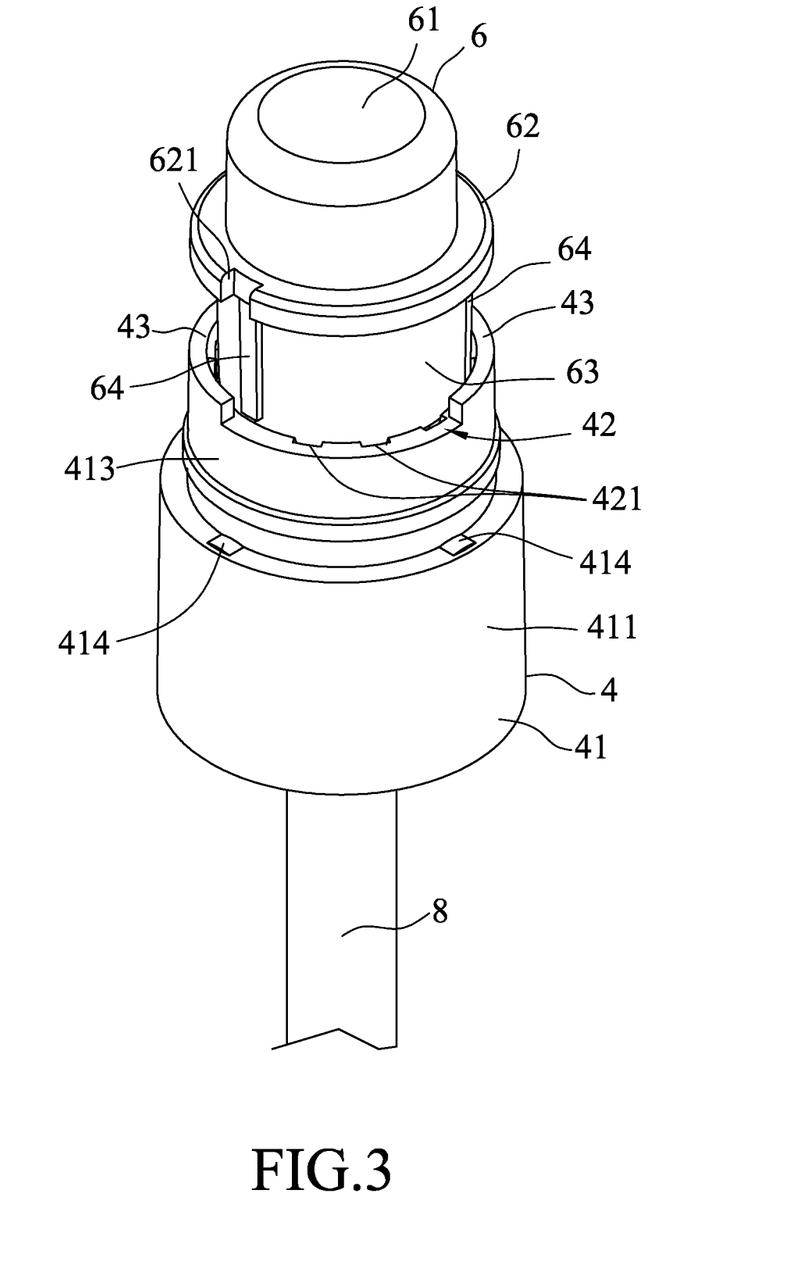
FIG. 3 is a fragmentary perspective view illustrating the preferred embodiment where a container and a locking connector are removed.

Referring to FIGS. 2 to 4, the press button 6 extends upwardly and outwardly through the through hole 511. In this embodiment, the press button 6 has three alignment rib portions 64 symmetrically spaced apart from each other. Each of the alignment rib portions 64 protrudes outwardly from an outer surface of the press button 6 and is insertable into a respective one of the dosage guide grooves 421. The press button 6 is driven by the adjusting cap 5 to rotate between a locked position, where each of the alignment rib portions 64 abuts against the top end of the locking connector 4 and is thereby limited from being pressed downward, and a pressable position, where each of the alignment rib portions 64 is aligned with the respective one of the dosage guide grooves 421 to enable pressing movement of the press button 6. In this embodiment, each of the alignment rib portions 64 is alignable with the respective one of the dosage guide grooves 421 of a respective one of the dosage guide units 42. Accordingly, the alignment rib portions 64 are simultaneously and respectively inserted into the guiding dosage grooves 421 that are equal in depth.

Preferably, the press button 6 further has two driven grooves 621, each of which is indented from an outer periphery of the press button 6 and permits insertion of a respective one of the driving rib units 53 in a downwardly and upwardly movable manner. Each of the driven grooves 621 is rotatable together with the respective one of the driving rib units 53 to rotate the press button 6 between the locked position where each of the alignment rib portions 64 abuts against the top surface of the annular protruding portion 413 and the pressable position where each of the alignment rib portions 64 is simultaneously aligned with the respective one of the dosage guide grooves 421. In this embodiment, the press button 6 further has a press portion 61 that extends outwardly through the through hole 511 of the adjusting cap 5 and presses downwardly and resiliently for fitting on a top end of the hollow suction member 7, an annular driving portion 62 that extends outwardly and radially from an outer surface of the press portion 61, that has the outer periphery of the press button 6, and that abuts against an inner surface of the top wall 51, and an annular inserting portion 63 that extends downwardly from the press portion 61 and is inserted into the locking ring 41 of the locking connector 4. In this embodiment, the press portion 61 has the form of a cup body that opens downwardly toward and that is disposed on the top end of the hollow suction member 7 in a capping manner. Each of the driven grooves 621 extends in the top-bottom direction through the outer periphery of the annular driving portion 62, such that the driving rib units 53 are respectively and movably engaged with the driven grooves 621. Each of the alignment rib portions 64 extends in the top-bottom direction and projects outwardly from an outer surface of the annular inserting portion 63.

Referring to FIGS. 2 and 5, the hollow suction member 7 defines an interior suction space 70, and has a hollow resilient head portion 71 that is opened downwardly and is sleeved around the pipette 8 and that is resiliently and downwardly compressible by the press button 6, and an annular limit portion 72 that extends outwardly from a bottom end of the hollow resilient head portion 71 and that is engaged with the engagement groove 412. In this embodiment, the hollow resilient head portion 71 extends in the locking connector 4 in the top-bottom direction and abuts upwardly against the press portion 61. In addition, the hollow resilient head portion 71 is formed as a bellows that is deformable by pressing the press portion 61 to change a dimension of the interior suction space 70.

Figure 6:
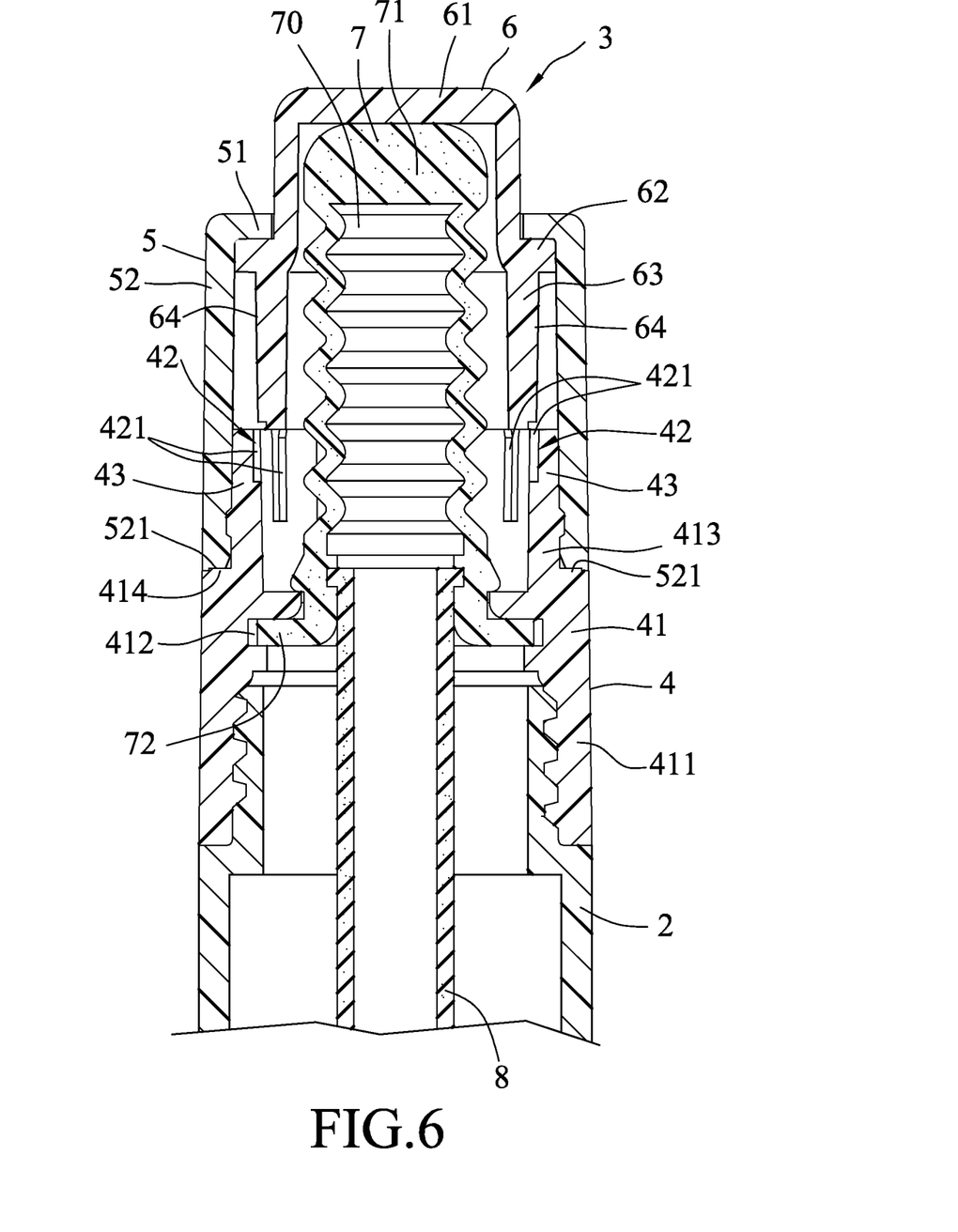
FIG. 6 is a view similar to FIG. 5, illustrating the press button in the pressable position.

With reference to FIGS. 2, 5 and 6, when the dropper assembly is in use, the hollow suction member 7 upwardly and resiliently abuts against the press button 6, and the annular driving portion 62 is limited to and abuts against the inner surface of the top wall 51, such that the press portion 61 extends outwardly through top of the adjusting cap 5. When the adjusting cap 5 is rotated relative to the locking connector 4 and drives the press button 6 to be in the locked position (see FIG. 5), the alignment rib portions 64 abut against the top surface of the annular protruding portion 413 and are away from the dosage guide units 42, respectively. Even though the press button 6 may be accidentally pressed, the alignment rib portions 64 are restricted by the annular protruding portion 413, and thus, unintentional drawing of the liquid in the container body 2 may be avoided.

Figure 7:
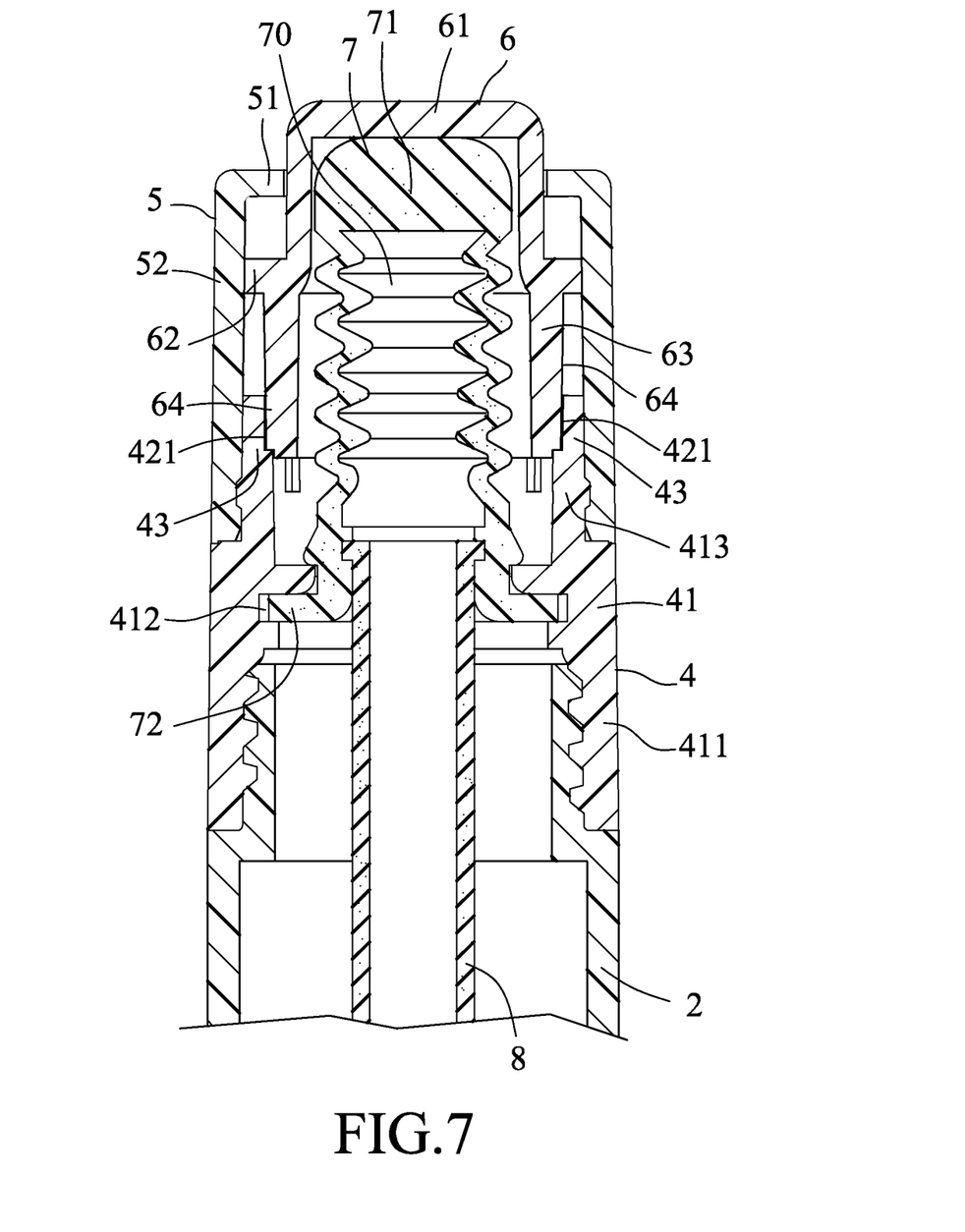
FIG. 7 is a view similar to FIG. 6, illustrating the press button in a pressed state.

When the liquid is required to be drawn from the container body 2, the adjusting cap 5 is rotated relative to the locking connector 4 and drives the press button 6 to be in the pressable position (see FIG. 6). According to the desired dosage of the liquid, the alignment rib portions 64 are respectively aligned with the dosage guide grooves 421 having the required depth to enable pressing movement of the press button 6. When the press button 6 is downwardly pressed relative to the adjusting cap 5, the alignment rib portions 64 are simultaneously and respectively inserted into the dosage guide grooves 421 until the movement of the alignment rib portions 64 is limited by the depths of the dosage guide grooves 421 (see FIG. 7). During pressing of the press button 6, the hollow resilient head portion 71 compressed by the press button 6 is deformed to decrease the volume of the interior suction space 70. When the press button 6 is released, the hollow resilient head portion 71 resiliently restores the press button 6 to an original position. When the volume of the interior suction space 70 is being restored, a negative pressure is generated and the liquid is drawn into the pipette 8 thereby. Then, the locking connector 4 is threadedly unfastened from the container body 2, so that the dropper mechanism 3 is detached from the container body 2. The press button 6 is pressed again to compress the hollow suction member 7 in order to dispense the liquid outwardly from the pipette 8 for use. It should be noted that the hollow resilient head portion 71 is not limited to be in the form of the bellows as long as the hollow suction member 7 can create the negative pressure to cause the liquid to be drawn into the pipette 8.

Since the order of the different depths of the dosage guide grooves 421 of each of the dosage guide units 42 is the same as that of the dosage guide grooves 421 of other dosage guide units 42, when the adjusting cap 5 is rotated relative to the locking connector 4, the alignment rib portions 64 can be simultaneously aligned with and inserted into the dosage guide grooves 421 having the same depth, respectively, in accordance with the desired dosages of the liquid. When the press button 6 compresses the hollow suction member 7, the distance traveled by the press button 6 is limited by the dosage guide grooves 421 such that the interior suction space 70 is adjustably compressed in a desired dimension to create the vacuum for drawing the desired amount of liquid into the pipette 8.

Referring to FIGS. 2, 4 and 5, when the adjusting cap 5 is rotated to drive movement of the press button 6 relative to the locking connector 4, each of the positioning tab portions 414 of the locking connector 4 is disengaged from the respective one of the positioning notches 521 so as to be engaged with an adjacent one of the positioning notches 521, i.e., moving each of the positioning notches 521 between two adjacent ones of the positioning tab portions 414 indicates that the press button 6 is driven to rotate in the locked position or in the pressable position where the alignment rib portions 64 can be rotated above the dosage guide grooves 421. Therefore, the rotation of the adjusting cap 5 is restrained by virtue of engagements between the positioning notches 521 and the positioning tab portions 414. However, in actual implementation, the adjusting cap 5 can be rotated relative to the locking connector without the engagements between the positioning notches 521 and the positioning tab portions 414.

In addition, the rotation of the adjusting cap 5 is restrained in clockwise and counterclockwise directions by virtue of the blocking flanges 43 limiting the driving rib units 53. Therefore, the rotation of the press button 6 is limited by the rotation of the adjusting cap 5 between the locked position and the relatively maximum depth of a respective one of the dosage guide grooves 421 of the respective one of the dosage guide units 42 in the pressable position. Accordingly, a user can readily rotate the adjusting cap 5 to drive the press button 6 in the pressable position for deciding the desired dosage of the liquid to be drawn.

It is noted that the numbers of the dosage guide units 42, the driving rib units 53, the alignment rib portions 64, and the driven grooves 621 are not limited to those of the preferred embodiment of this invention, and one dosage guide unit 42, one driving rib unit 53 and one alignment rib portion 64 may be used in other embodiments. In addition, the locking connector 4 may have only one blocking flange 43 for limiting the driving rib unit 53 so as to restrain the rotation of the adjusting cap 5.

To sum up, by virtue of the dropper mechanism 3, the adjusting cap 5 is stepwise rotated to drive the press button 6 relative to the locking connector 4, such that the user can decide the desired dosage of the liquid to be drawn into the pipette 8 through the hollow suction member 7 from the container body 2 without paying attention to graduation markings on the pipette 8. Moreover, by virtue of engagements between the positioning notches 521 and the positioning tab portions 414, the movement of the adjusting cap 5 is limited relative to the locking connector 4, and thus the user can readily decide to draw and use the desired dosage of the liquid in the pipette 8 or rotate the adjusting cap 5 to drive the press button 6 in the locked position.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:
1. A dropper assembly comprising:
a container body; and
a dropper mechanism disposed on said container body in a capping manner, said dropper mechanism including:
a locking connector that is threadedly mounted on said container body and that has at least one dosage guide unit indented from a top end of said locking connector, said dosage guide unit having a plurality of dosage guide grooves that are indented to different depths from said top end in a top-bottom direction;
an adjusting cap rotatably covering and mounted on said locking connector, said adjusting cap having a top wall, and a through hole extending through said top wall in the top-bottom direction;
a press button that is mounted in said adjusting cap and that extends upwardly and outwardly through said through hole, said press button having at least one alignment rib portion that protrudes outwardly from an outer surface of said press button, and that is insertable into one of said dosage guide grooves, said press button being driven by said adjusting cap to rotate between a locked position, where said alignment rib portion abuts against said top end of said locking connector and is thereby limited from being pressed downward, and a pressable position, where said align- ment rib portion is aligned with one of said dosage guide grooves to enable pressing movement of said press button;

a hollow suction member that is resiliently deformable to be pressed by said press button and that is mounted between said press button and said locking connector, said hollow suction member defining an interior suction space; and a pipette that is inserted into said hollow suction member in a fluidly communicating manner and that extends downwardly into said container body;

wherein said locking connector further has a locking ring that is threadedly mounted on said container body, and at least one blocking flange that protrudes from a top surface of said locking ring, said dosage guide unit being disposed on said locking ring, said dosage guide grooves extending downwardly from said top surface of said locking ring inwardly of said blocking flange and being indented from an inner surface of said locking ring, said adjusting cap further having a surrounding wall that extends downwardly from a periphery of said top wall and that is rotatably sleeved on and positioned to said locking ring, and at least one driving rib unit that protrudes inwardly from an inner surface of said surrounding wall and that is rotatable together with said surrounding wall to move on said top surface of said locking ring, said blocking flange being able to abut against and limit said driving rib unit to a limited amount of movement, said press button further having a driven groove that is indented from an outer periphery of said press button and that permits insertion of said driving rib unit in a downwardly and upwardly movable manner, said driven groove being rotatable together with said driving rib unit to rotate said press button between the locked position where said alignment rib portion abuts against said top end of said locking connector and the pressable position where said alignment rib portion is aligned with one of said dosage guide grooves.

2. The dropper assembly as claimed in claim 1, wherein said press button further has a press portion that extends outwardly through said through hole of said adjusting cap and presses downwardly and resiliently a top end of said hollow suction member, an annular driving portion that extends outwardly and radially from an outer surface of said press portion, that has said outer periphery of said press button, and that abuts against an inner surface of said top wall, and an annular inserting portion that extends downwardly from said press portion and is inserted into said locking ring of said locking connector, said driven groove extending in the top-bottom direction through said outer periphery of said annular driving portion, said alignment rib portion extending in the top-bottom direction and projecting outwardly from an outer surface of said annular inserting portion.

3. The dropper assembly as claimed in claim 2, wherein said press portion has the form of a cup body that opens downwardly toward and that is disposed on said top end of said hollow suction member in a capping manner.

4. The dropper assembly as claimed in claim 1, wherein said locking ring has an annular threaded portion that has internal threads formed on said inner surface of said locking ring and that is threadedly mounted on said container body, an annular protruding portion that projects upwardly from a top periphery of said annular threaded portion and that has a diameter smaller than that of said annular threaded portion, and a positioning tab portion that protrudes from said top surface of said locking ring, said blocking flange protruding from a top surface of said annular protruding portion, said dosage guide grooves extending downwardly from said top surface of said annular protruding portion, said surrounding wall of said adjusting cap being rotatably fitted around said annular protruding portion and stacked on said positioning tab portion, said surrounding wall having a plurality of positioning notches that are annularly spaced apart from each other and that are indented from a bottom surface of said surrounding wall, said positioning tab portion being releasably engaged with one of said positioning notches.

5. The dropper assembly as claimed in claim 2, wherein said locking connector has a plurality of said dosage guide units that are annularly spaced apart from each other on said locking ring, an order of the different depths of said dosage guide grooves of each of said dosage guide units being the same as that of said dosage guide grooves of the other one of said dosage guide units, said press button further having a plurality of said alignment rib portions, each of which is alignable with one of said dosage guide grooves of a respective one of said dosage guide units, said alignment rib portions being simultaneously and respectively inserted into said dosage guide grooves that are equal in depth.

6. The dropper assembly as claimed in claim 5, wherein said locking connector has two of said blocking flanges that are angularly spaced apart from each other, said adjusting cap having two of said driving rib units that protrude inwardly from said inner surface of said surrounding wall and that are angularly spaced apart from each other to be limited by said blocking flanges, respectively, said press button having two of said driven grooves, said driving rib units being respectively and movably engaged with said driven grooves.

7. The dropper assembly as claimed in claim 4, wherein said annular threaded portion further has an engagement groove that is indented radially from said inner surface of said locking ring above said internal threads of said annular threaded portion, said hollow suction member having a hollow resilient head portion that is opened downwardly and is sleeved around said pipette and that is resiliently and downwardly compressible by said press button, and an annular limit portion that extends outwardly from a bottom end of said hollow resilient head portion and that is engaged with said engagement groove.

8. The dropper assembly as claimed in claim 7, wherein said hollow resilient head portion is formed as a bellows.

* * * * *